Figure 7:
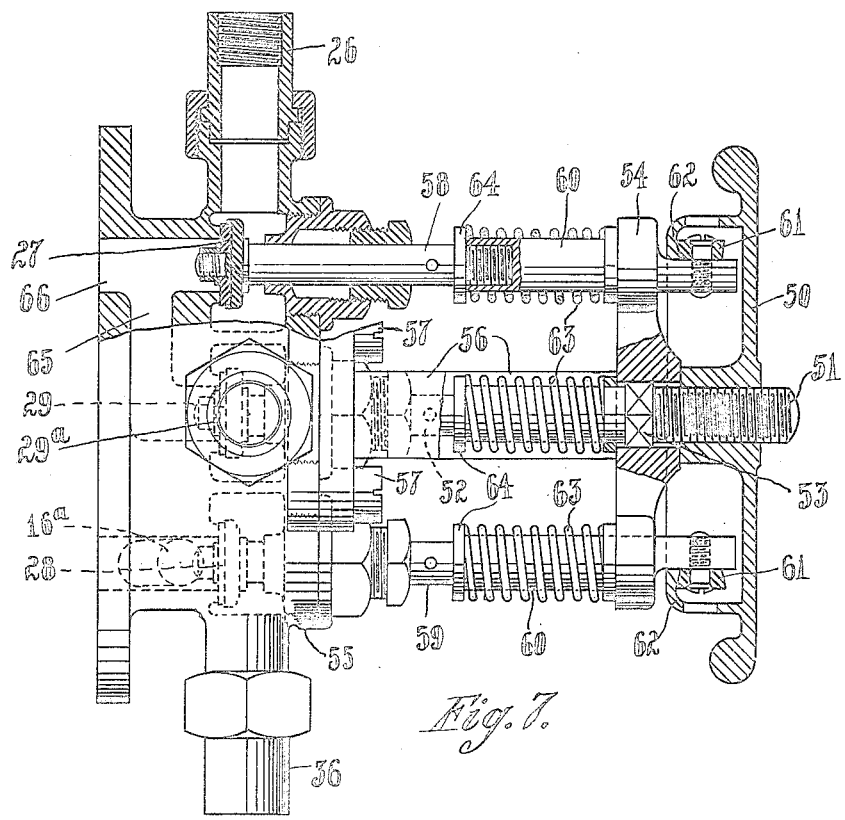

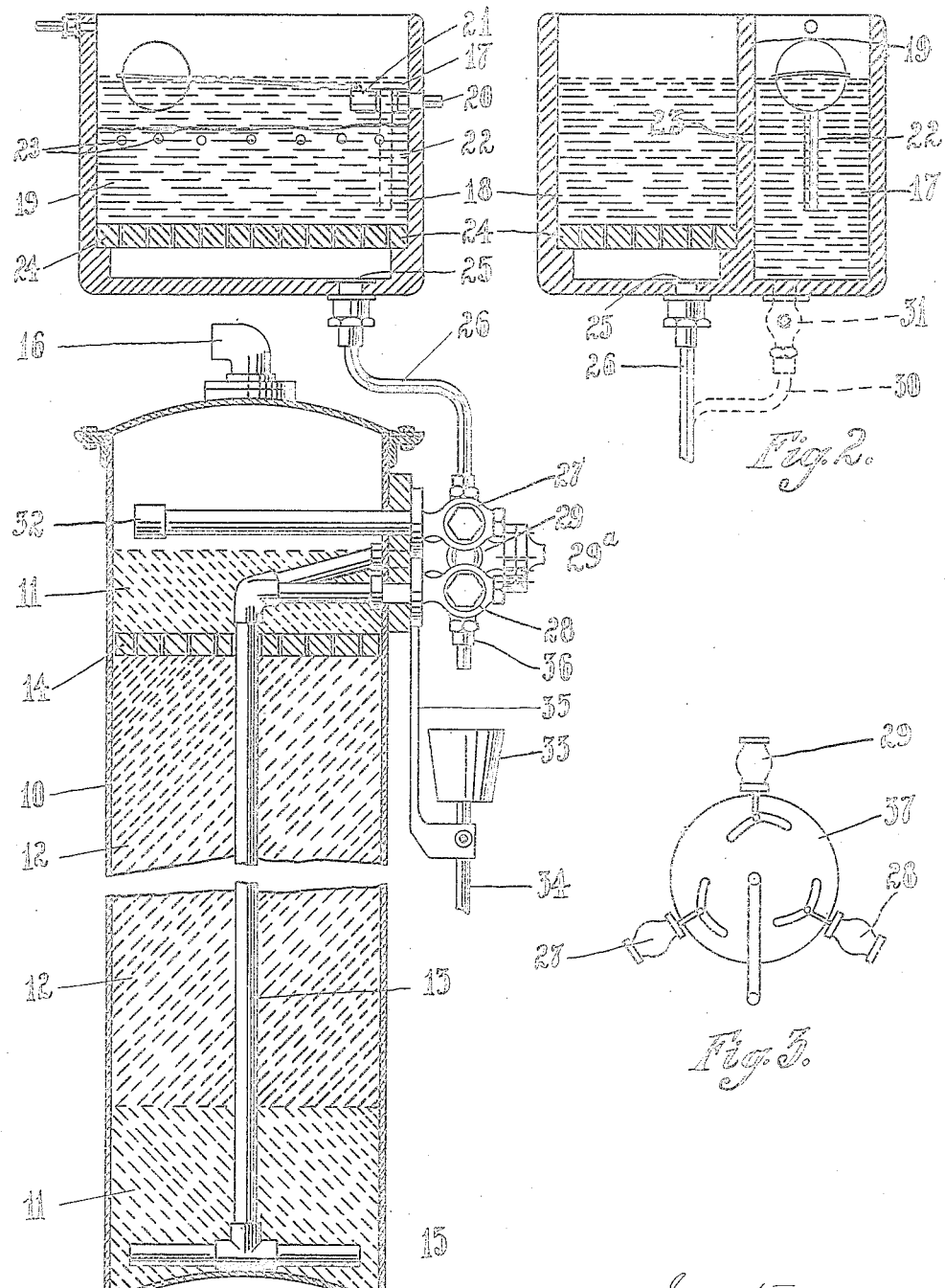

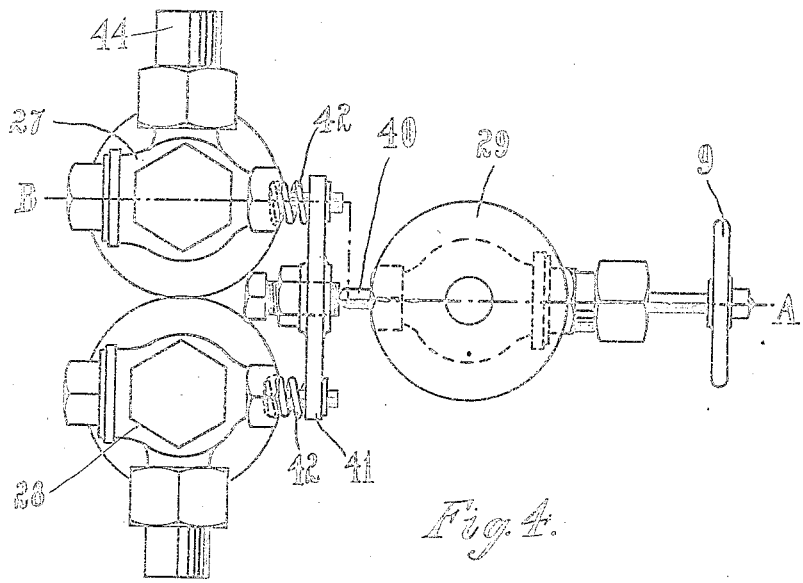
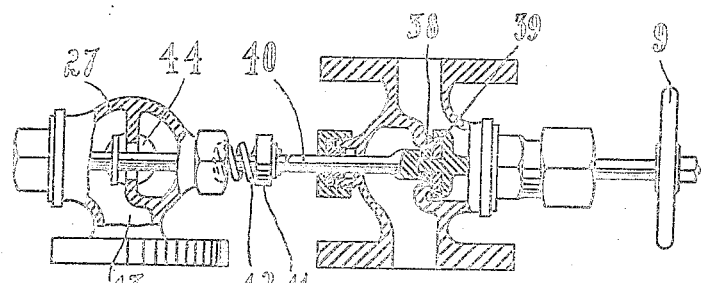
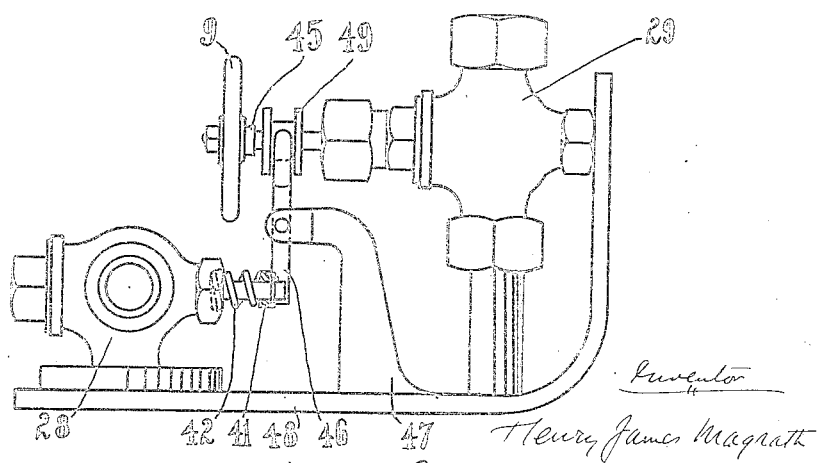

H. J. MAGRATH.
TREATMENT OF WATER FOR SOFTENING, STERILIZING, AND LIKE PURPOSES.
APPLICATION FILED JULY 21, 1915.

1,211,735.

Patented Jan. 9, 1917.
3 SHEETS—SHEET 3.

UNITED STATES PATENT OFFICE.

HENRY JAMES MAGRATH, OF POPLAR, LONDON, ENGLAND.

TREATMENT OF WATER FOR SOFTENING, STERILIZING, AND LIKE PURPOSES.

1,211,735.  Specification of Letters Patent.  Patented Jan. 9, 1917.

Application filed July 21, 1915. Serial No. 41,174.

*To all whom it may concern:*

Be it known that I, HENRY JAMES MAGRATH, a subject of the King of Great Britain, and residing at 196 High street, Poplar, London, England, have invented certain new and useful Improvements Relating to the Treatment of Water for Softening, Sterilizing, and like Purposes, of which the following is a specification.

This invention relates to the treatment of water for softening, sterilizing and like purposes. The apparatus employed is of the type wherein the medium used for the treatment of the water consists of natural or artificial zeolites or the like, while a salt or compound is required for periodical regeneration or revivifying of the said medium after it has become inert or incapable of performing its principal object of removing hardness from water, or sterilizing the same and so forth.

The invention relates more particularly to small plants such as are used for domestic and like purposes, for which skilled attention is not available, although it is also applicable to plants employed on any scale or for any purposes.

It is the principal object of the invention to simplify the plant and the regenerating operation, and to render it practically impossible for mistakes to be made in the conduct of the operations required.

A further object is to prevent as far as possible the risk of corrosion in the tanks used, as such corrosion has previously caused trouble in working.

The method of working is comparatively simple as few valves or cocks are required, and they are arranged to be controlled by a single handle which will make impossible errors in the working of the valves. Further, a much smaller tank is required than hitherto for the regenerating or revivifying solution so that it can be made of earthenware if desired, and the method of working is such that even if the tank is not of earthenware the corrosion will be very much reduced.

In working according to this invention, a complete salt solution is not made before each regenerating or revivifying operation, but the requisite quantity of the salt is placed on a perforated plate or grating in a comparatively small tank, and water from an adjacent compartment of the tank slowly flows over the salt forming a solution which passes through the cylinder containing the zeolites or the like. A continuous flow of water is maintained, carrying with it ultimately all the salt in solution, and afterward serving to wash out the cylinder leaving it ready for use again. Then a single valve controls the flow of water from the crude water inlet to the softening or like plant, and the closing of this valve serves automatically to open two other valves permitting respectively the salt solution to flow from its tank into the cylinder for regenerating or revivifying, and the used solution to flow from the said cylinder out to the drain. The opening movement of the main valve automatically closes the other two valves.

The invention is illustrated by way of example in the accompanying drawings, wherein:—

Figure 8:
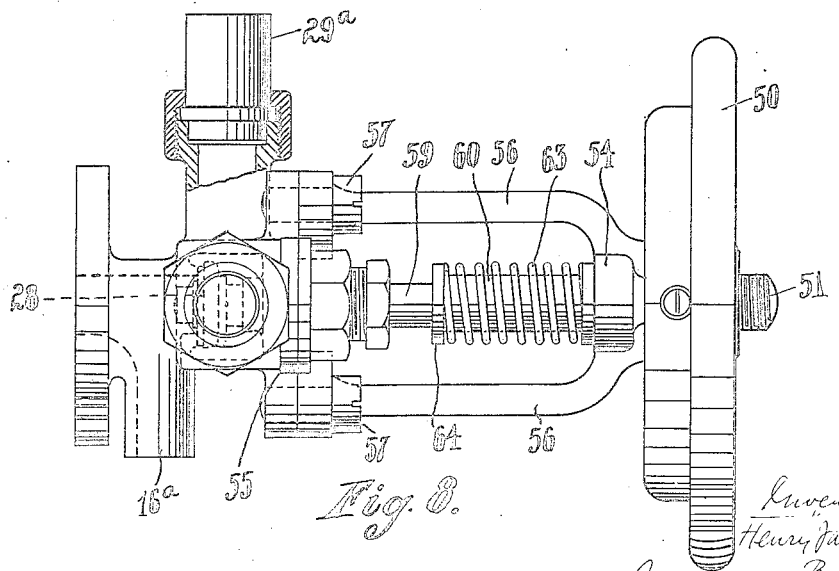

Figure 1 shows the whole apparatus, partly in section and partly broken away. Fig. 2 shows a section through the tank at right angles to Fig. 1. Fig. 3 is a diagram showing one method of interconnecting the valves. Fig. 4 is a face view, and Fig. 5 a section on the line A—B of Fig. 4, showing another arrangement of the interconnected valves. Fig. 6 is a side view showing another arrangement of the valves. Fig. 7 is a side view of a further arrangement of the valves, partly broken away, and Fig. 8 is a view at a right angle to Fig. 7.

Referring first to Figs. 1 and 2, the cylinder 10 contains the zeolites or the like and the filtering material disposed in the usual or any convenient manner therein. In the drawing, 11 are layers of gravel or quartz which serve for filtering, and 12 represents the zeolite material. A substantial disk 14 with perforations therein as shown, permitting water to pass therethrough, rests on the top of the layer of zeolites and is free to move downwardly in the cylinder around the central pipe 13, so that it will always rest upon the zeolite material even if the said material settles down in use. The water to be purified normally flows in at 29ª through valve 29, and pipe 13, through a perforated distributer 15 at the lower end thereof, upwardly through the lower layer of quartz or the like 11, through the zeolites 12, the upper layer of quartz or the like, and out from the top of the cylinder 10 through the pipe 16 which delivers the softened and purified water. The tank for preparing and supplying the solution of salt for revivifying, is arranged at a higher level than the cylinder 10 and comprises two compartments 17 and 18 separated by a partition wall 19, Fig. 2. This wall is shown as being partly broken away in Fig. 1. Water is supplied to the compartment 17 through a pipe 20 from a steady water supply leading to a ball cock 21, from which a pipe 22 preferably leads down to discharge the water below the surface level in the tank and so to avoid unnecessary noise in the inflow of the water. Openings at 23 in the wall 19 or arranged in any other convenient manner, serve to permit the water to flow through into the compartment 18 and to fill it to the same level as the other compartment 17. At or near the bottom of the larger compartment 18 is placed a grid or perforated plate 24, and beneath the same is the outlet orifice 25 leading by a pipe 26 to the valve 27 hereinafter referred to. Each time that regeneration or revivifying is to take place the necessary quantity of the salt is thrown into the compartment 18 of the tank on to the grid 24. Then when the flow of water takes place it passes over and through the salt and through the grid, the salt solution which passes through usually remaining substantially saturated so long as the salt lasts, after which clear water will flow through for washing purposes. It will be seen that the tank can be comparatively small because the solution is only made by the steady flow of water over and through the salt when the solution is required. If it is not required that the salt solution flowing through pipe 26 to the cylinder 10 should be substantially saturated, it can be diluted to any required extent by providing for example a by-pass pipe 30 as shown in dotted lines in Fig. 2, opening from the bottom of the float valve compartment 17 of the tank and leading to the pipe 26. The flow of liquid through this by-pass pipe 30 may be regulated or adjusted once and for all by a cock 31 having a squared stem only fitted by a suitable tool, so that it cannot be interfered with during normal working. Even if a saturated salt solution flows into the cylinder however, it will become diluted therein, so that the by-pass pipe 30 is not an essential part of the apparatus. The tank with the compartments 17 and 18 (and the grid 24) may be made of earthenware or the like, so that it will not be liable to corrode. Even if it is of metal, the fact that it is always filled with water considerably reduces the risk of corrosion. During regenerating or revivifying of the zeolite material or the like in the cylinder 10, the direction of flow therethrough is preferably reversed as compared with the normal flow, the salt solution entering through the valve 27 leading to the perforated distributer 32 near the top of the cylinder, and passing out through distributer 15, pipe 13, and valve 28 which communicates with said pipe in parallel with valve 29. The water in the cylinder 10 is not emptied therefrom before the regenerating operation. The outflow of the spent liquor after the regeneration, preferably takes place through an open gap, so that the rate of flow can be seen; for instance the outflowing liquid may drop into a cup 33 leading by pipe 34 to a drain, and supported by a bracket 35. The outflow may be controlled of course by the adjustment of valves 27 and 28, but it may be desirable to provide a suitable valve 36, which may be a cone-seated or needle valve, and which can be set to the normal rate of flow, but can be opened wider when required to allow a considerable stream of water to flow through for final cleansing after regenerating. The valve is shown as being of a type which is screwed up by a spanner fitting a nut, but any other suitable type might be used. The valves are interlocked for operation in any convenient manner. For example, the screwing down or closing of the main valve 29 may be effected through a stem with a spring therein, which, after the main valve is closed, will be compressed by further movement, this further movement being utilized by mechanical connections to open the two auxiliary valves 27 and 28. Such an arrangement will insure that the auxiliary valves are only opened for regenerating and washing when the main valve is closed, and vice versa. Whatever construction is adopted however, it must be such that a single handle when operated will control the main valve 29, and will serve by a further movement after the closing of the main valve, to open the auxiliary valves 27 and 28.

In Fig. 3 a construction is illustrated in diagram form, wherein the turning of a disk 37 with cam grooves in it, opens and closes the valves. The disk is shown in an intermediate position wherein all the valves are closed; turning in the clockwise direction does not move valves 27 and 28 as concentric parts in their cam grooves are in action, but the valve 29 is opened as its cam groove is inwardly directed at the side which is brought into action. Turning in the other direction keeps valve 29 closed, but opens valves 27 and 28 in a similar manner.

In Figs. 4 and 5, a construction is shown wherein the main valve 29 is opened and closed by a handle 9 and a screw stem, and has a disk or plug 38 which obstructs the flow before the washer 39 becomes seated on the valve seat. Further movement of the valve stem after plug 38 has begun to obstruct the flow, is communicated by the stem 40 and bridge piece 41 to the stems of the two valves 27 and 28, causing both of these to open against the action of the springs 42, before washer 39 finally becomes seated and stops further movement of the stem. On reverse movement, these springs insure the closing of the valves 27 and 28 before the plug 38 leaves a free passage for the water through valve 29. The valves 27 and 28 are preferably so arranged, as shown for valve 27 in the section, Fig. 5, that the pressure of the water tends to keep the valves closed. In the case of valve 27 for instance the underside of the partition communicates with the cylinder 10 through the passage 43, while the outlet 44 is at the side opposite the valve.

Fig. 6 is a view in a position corresponding with Fig. 5, and is only intended to illustrate a modification wherein the use of a stem passing through the end of valve 29 is avoided, the motion being conveyed by a collar 45 on the stem of the valve 29 engaging a sleeve 49 which slides on the stem and is engaged by the forked end of a lever 46 pivoted on bracket 47; the other end of the lever presses upon the bridge piece 41 which opens the valves 27 and 28 against the action of springs 42 when the handle 9 is turned farther after valve 29 is closed. The valves are carried in this case by a plate 48 adapted to be secured to the cylinder 10.

In Figs. 7 and 8 a construction is shown wherein the main valve is opened and closed by a hand wheel 50 having a threaded opening at the center, through which passes a screwed stem 51 mounted upon the end of the valve spindle 52. The screwed stem 51 is provided with a square portion 53 guided in a bridge piece 54 connected to the valve casing 55 by means of arms 56 secured to the valve casing by screw studs 57. The spindles 58 and 59 of the auxiliary valves 27 and 28 are provided with extensions 60 which at their upper ends carry conical rollers 61 adapted to run on an inwardly turned flange 62 provided for the purpose on the hand wheel 50. The valves are normally pressed toward their seats by means of springs 63 mounted around the extensions of the valve spindles and acting between the bridge piece 54 and collars 64 mounted on the valve spindles. When turning the hand wheel 50 in a clockwise direction, the central valve 29 will be drawn off its seat against the action of its spring, the two outer valves 27 and 28 remaining closed. Water from the main will now flow from the inlet pipe 29ª past the valve 29, and through the passages 65 and 66 into the perforated distributer 32, then through the purifying and softening material, through the distributer 15 and upward through the pipe 13 and a by-pass 16ª, Fig. 8, in the valve chamber 28. On turning the hand wheel 50 in the reverse direction the spring 63 will close the valve 29, and when this valve has been closed completely the hand wheel 50 will rise on the screw stem 51, thus lifting the valves 27 and 28 off their seats against the action of their springs 63 as the flange 62 on the hand wheel 50 will press the rollers 61 away from the bridge piece 54. Salt solution can now pass through the pipe 26 and passage 66 into the cylinder and pass out of the latter through the valve 28 and the outlet pipe 36. The weight of the salt solution flowing in at 32 is relied upon to effect the necessary circulation by displacement, as the salt solution is heavier than the water which it displaces. Some diffusion of the salt solution also takes place of course. The action could be made to take place by upward displacement if preferred, in which case valve 27 would communicate with pipe 13, and valve 28 with distributer 32. During the regenerating or revivifying, the water level in the tank 18 is substantially maintained by the ball-cock 21, so that a steady flow takes place, and not a flow under varying pressure as is the case when a tank is used which gradually empties. The valves 27 and 28 are adjusted so that the flow of the salt solution takes a long time, usually some hours, the regenerating or revivifying being commonly effected during the night. The clean water flows for some time after the salt solution, when all the salt in tank 18 has been dissolved, and then when the main valve 29 is opened by hand, the auxiliary valves 27 and 28 are automatically closed, and the normal working of the apparatus is resumed with the supply of softened water through the outlet 16 or 16ª.

As will be inferred from the description already given, the invention is not limited in its application to water softening plants using natural or artificial zeolites for softening hard water. The invention is applicable to all similar plants in which regeneration or revivifying of some active material is required. For example, in case iron is to be removed from water, or if water is to be sterilized, a different form of the zeolite medium is employed and it requires revivifying with a salt such as permanganate of potash. The solution of this salt will be made in the tank in the manner above explained.

Having thus described my invention what I claim as new and desire to secure by Letters Patent is:—

1. Apparatus for use in softening, purifying and otherwise acting upon water, and for regenerating or revivifying the active material employed therein, said apparatus comprising a receptacle for containing the active material, a tank for supplying the salt solution and also water with means for supporting salt therein while it is dissolved by the flow of water therethrough, and three valves adapted to control respectively the admission to the receptacle of fresh water to be treated, the admission of liquid from the tank, and the outflow of waste liquid from the receptacle, with means for operating said valves such that a movement of the operating means in one direction will close the valve which admits water to be treated to the receptacle, and will open the valve admitting liquid from the tank and the valve permitting outflow of waste liquid from the receptacle, and return movement of said operating means will close the valve communicating with the tank and the valve for outflow of waste liquid from the receptacle, and will then open the valve for admitting fresh water to be treated to the receptacle.

2. Apparatus for use in softening, purifying and otherwise acting upon water, and for regenerating or revivifying the active material employed therein, said apparatus comprising a receptacle for containing the active material, a valve for the admission to the receptacle of water to be treated, a tank divided into two compartments with means of communication between said compartments, means for maintaining the supply of water to one compartment, means for supporting a charge of regenerating material in the second compartment and a pipe leading from said second compartment to the receptacle for the active material, a valve in said pipe, and a valve for controlling the outflow of waste liquid from the receptacle, an operating handle and means connecting together the three valves before mentioned with said operating handle, said means being such that the movement of the handle in one direction cuts off the supply of water to be treated and opens the valves leading from the tank to the receptacle and from the receptacle to the outflow respectively, while the return movement of the handle closes the latter two valves and then opens the valve for admitting water to be treated to the receptacle.

3. Apparatus for use in softening, purifying and otherwise acting upon water, and for regenerating or revivifying the active material employed therein, said apparatus comprising a receptacle for containing the active material, a valve for the admission of water to be treated to the receptacle, a tank divided into two compartments with means of communication between said compartments, means for maintaining the supply of water to one compartment, a perforated tray in the other compartment adapted to support the salt requisite for regenerating the active material, a pipe leading out from the latter compartment beneath the tray, a valve in said pipe communicating with the receptacle for the active material, a valve for permitting outflow of waste liquid from the receptacle, and operating means for said valves adapted to maintain the second and third valves closed when the first mentioned valve is open, and the first mentioned valve closed when the second and third valves are open.

HENRY JAMES MAGRATH.